(12) United States Patent
Nichols (10) Patent No.: US 12,445,890 B2
(45) Date of Patent: Oct. 14, 2025

(54) DISTRIBUTED, DYNAMIC PROBING IN COMMUNICATIONS NETWORK

(71) Applicant: DISH Wireless L.L.C., Englewood, CO (US)

(72) Inventor: Cory Nichols, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 433 days.

(21) Appl. No.: 18/065,566

(22) Filed: Dec. 13, 2022

(65) Prior Publication Data

US 2024/0196259 A1    Jun. 13, 2024

(51) Int. Cl.
H04W 28/02    (2009.01)

(52) U.S. Cl.
CPC ... *H04W 28/0226* (2013.01); *H04W 28/0215* (2013.01)

(58) Field of Classification Search
CPC ..... H04L 43/0852; H04L 43/20; H04L 43/10; H04L 41/0897; H04L 69/40; H04L 41/40; H04L 41/0631; H04L 41/0856; H04L 41/0895; H04L 41/0894; H04L 49/70; H04L 61/103; H04L 41/0893; G06F 11/07; G06F 9/45558; G06F 9/455; G06F 2009/45595
See application file for complete search history.

(56) References Cited

U.S. PATENT DOCUMENTS

| | | | | |
|---|---|---|---|---|
| 9,510,209 B2 * | 11/2016 | Randall | .............. | H04W 16/225 |
| 2005/0192015 A1 * | 9/2005 | Abusch-Magder | ... | H04W 16/18 |
| | | | | 455/442 |
| 2016/0157106 A1 * | 6/2016 | Randall | .............. | H04W 16/225 |
| | | | | 455/446 |
| 2018/0173557 A1 * | 6/2018 | Nakil | ................. | H04L 43/0852 |
| 2020/0177459 A1 * | 6/2020 | Berman | ............. | H04L 43/0811 |
| 2024/0098512 A1 * | 3/2024 | Hobbs | ................. | H04B 17/328 |
| 2025/0047355 A1 * | 2/2025 | Liu | ...................... | H04W 48/12 |

* cited by examiner

*Primary Examiner* — Jung Liu
(74) *Attorney, Agent, or Firm* — Seed Intellectual Property Law Group LLP (57) ABSTRACT

Technologies for distributed, dynamic probing for a communications network are disclosed. An example method for distributed, dynamic probing of cell sites includes determining locations of cell sites that serve a communications network, and determining locations for probing virtual servers based on the locations of cell sites. The method also includes implementing one or more probing virtual servers in accordance with the determined locations for the probing virtual servers, using the probing virtual server(s) to conduct active probing of cell site(s), and analyzing results from the active probing to initiate one or more remediation actions.

20 Claims, 4 Drawing Sheets

DISTRIBUTED, DYNAMIC PROBING IN COMMUNICATIONS NETWORK

BACKGROUND

In telecommunications, 5G is the fifth-generation technology standard for broadband cellular networks. 5G networks are cellular networks, in which the service area is divided into small geographical areas called cells. 5G wireless devices in a cell can communicate by radio waves with a cellular base station (e.g., located on a cellular tower) via fixed antennas, over frequency channels. The base stations can be connected to switching centers in the telephone network and routers for Internet access by high-bandwidth optical fiber or wireless backhaul connections.

The status of individual cells is important to the operation of network, providing a basis for maintenance and remediation actions. There is a need for technologies that facilitate efficient probing of cell sites to determine cell status.

BRIEF SUMMARY

In some implementations of a communications network (e.g., a 5G network), the entirety or at least some components or elements of the network core (e.g., 5G core) can be implemented logically or virtually, via one or more cloud service providers. The network core communicates with various cell sites that are located in different geographic or network locations, subjecting to control of same or different entities. In some embodiments, a computer-implemented method for distributed, dynamic probing of cell sites associated with the communications network includes determining locations of a plurality of cell sites that serve the communications network, and determining locations for a plurality of probing virtual servers based, at least in part, on the locations of cell sites. The method further includes implementing one or more probing virtual servers in accordance with the determined locations for the plurality of probing virtual servers, using the one or more probing virtual servers to conduct active probing of at least a subset of the plurality of cell sites, and analyzing results from the active probing to initiate one or more remediation actions for the communications network.

In some embodiments, the locations of the plurality of cell sites include at least one of a geographic location or network location. In some embodiments, determining locations for the plurality of probing virtual servers comprises determining respective proximities between one or more data centers of a cloud service provider and the plurality of cell sites. In some embodiments, determining the respective proximities is based on at least one of a physical distance or network distance. In some embodiments, determining locations for the plurality of probing virtual servers is further based on at least one of a capacity, availability, compatibility, computational capability, or communication capability of the one or more data centers.

In some embodiments, the method further includes determining timing for active probing of the at least a subset of the plurality of cell sites. In some embodiments, determining the timing for active probing is based, at least in part, on the determined locations of the plurality of probing virtual servers. In some embodiments, determining the timing for active probing is based, at least in part, on at least a real-time status or condition of the communications network. In some embodiments, implementing the one or more probing virtual servers is further based on the determined timing for active probing.

In some embodiments, analyzing the results from the active probing comprises determining at least one of a cell outage, communication degradation, or service malfunction.

In some embodiments, a probing system for the communications network includes at least one memory that stores computer executable instructions, and at least one processor that executes the computer executable instructions to cause actions to be performed. The actions include determining locations for a plurality of probing virtual servers based, at least in part, on the locations of a plurality of cell sites that serve the communications network, implementing one or more probing virtual servers in accordance with the determined locations for the plurality of probing virtual servers, using the one or more probing virtual servers to conduct active probing of at least a subset of the plurality of cell sites, and analyzing results from the active probing to initiate one or more remediation actions for the communications network.

In some embodiments, determining locations for the plurality of probing virtual servers comprises determining respective proximities between one or more virtual service implementation systems of a cloud service provider and the plurality of cell sites. In some embodiments, the actions further comprise determining timing for active probing of the at least a subset of the plurality of cell sites. In some embodiments, determining the timing for active probing is based on at least one of a capacity, availability, compatibility, computational capability, or communication capability of the one or more virtual service implementation systems. In some embodiments, implementing the one or more probing virtual servers is further based on the determined timing for active probing.

In some embodiments, the actions further include requesting one or more remote systems to remediate at least a cell site condition based, at least in part, on the analyzed results.

In some embodiments, a non-transitory computer-readable medium stores contents that, when executed by one or more processors, cause the one or more processors to perform actions. The actions include determining locations for a plurality of probing virtual servers based, at least in part, on the locations of a plurality of cell sites associated with a communications network, implementing one or more probing virtual servers in accordance with the determined locations for the plurality of probing virtual servers, using the one or more probing virtual servers to conduct active probing of at least a subset of the plurality of cell sites, and analyzing results from the active probing to initiate one or more remediation actions for the communications network.

In some embodiments, determining locations for the plurality of probing virtual servers comprises determining a measure of proximity based on at least one of a physical distance or network distance. In some embodiments, the actions further include determining timing for active probing of the at least a subset of the plurality of cell sites. In some embodiments, implementing the one or more probing virtual servers is further based on the determined timing for active probing.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

Figure 1:
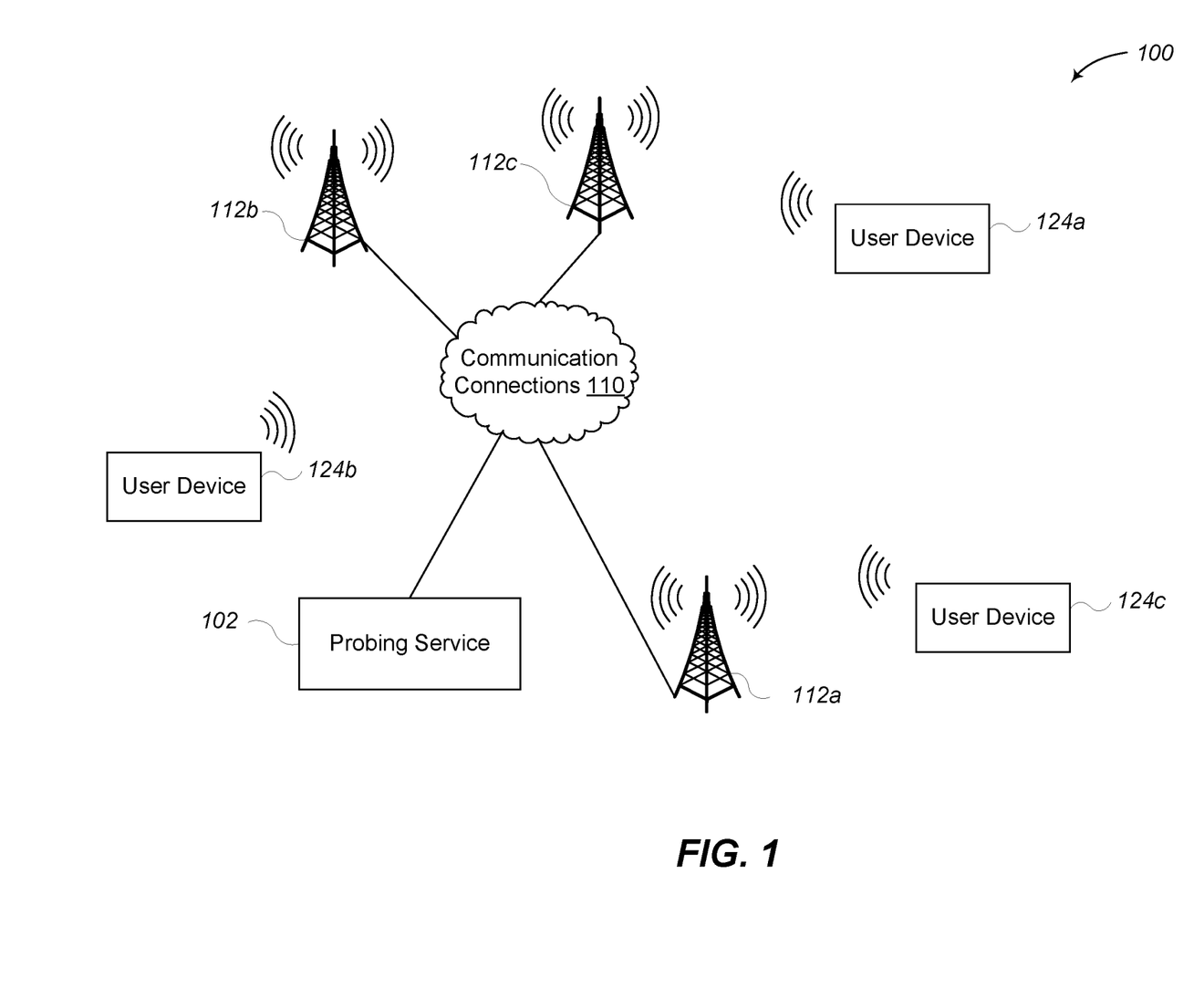
FIG. 1 is a block diagram illustrating an example networked environment for active probing for a communications network in accordance with some embodiments of the techniques described herein.

FIG. 1 is a block diagram illustrating an example networked environment 100 for active probing for a communications network in accordance with some embodiments of the techniques described herein. Environment 100 includes a plurality of cells 112a-112c, a plurality of user devices 124a-124b, a probing service 102, and communication connections 110. Illustratively, the cells 112a-112c correspond to cell sites (e.g., cellular towers) that together implement a 5G cellular communications network. The cells 112a-112c may include or be in communication with base stations, radio back haul equipment, antennas, or other devices, which are not illustrated for case of discussion.

Each cell 112 provides 5G compatible cellular communications over a coverage area. The coverage area of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. Although embodiments are directed to 5G cellular communications, embodiments are not so limited and other types of cellular communications technology may also be utilized or implemented. In various embodiments, the cells 112a-112c may communicate with each other via communication connections 110. Communication connections 110 include one or more wired or wireless networks, which may include a series of smaller or private connected networks that carry information between the cells 112a-112c.

The user devices 124a-124c are computing devices that receive and transmit cellular communication messages or other data with the cells 112a-112c, e.g., via antennas or other means. Examples of user devices 124a-124c may include, but are not limited to, mobile devices, smartphones, tablets, cellular-enabled laptop computers, or other user equipment (UE) or computing devices that can communicate with a 5G cellular network.

In various embodiments, the probing service 102 can include one or more computing devices to perform probing related functions described herein. In some embodiments, the probing service 102 interfaces or otherwise communicates with one or more elements of the 5G network core via the communication connections 110. The 5G network core or at least some components or elements thereof can be implemented, virtually or logically, via cloud computing services provided by one or more cloud service providers. The probing service 102 can include or establish one or more virtual servers to conduct active probing, via cloud computing services provided by the same or different cloud service provider(s). As an example, standard computer server(s) can be used to deploy a virtual machine on it and install a virtualized router or python code to perform probing. The interface between the probing service 102 and the core element(s) may be direct or may leverage an external API or other gateway. In some embodiments, the probing service 102 can interface or otherwise communicate with cell sites (e.g., cellular towers or controllers thereof), or with systems or devices external to the 5G network. In some embodiments, the probing service 102 is partly or entirely implemented inside or outside the 5G network core.

The above description of the exemplary networked environment 100 and the various services, systems, networks, and devices therein is intended as a broad, non-limiting overview of an example environment in which various embodiments of the presently disclosed technologies may be implemented. FIG. 1 illustrates just one example of an operating environment, and the various embodiments discussed herein are not limited to such an environment. In particular, the networked environment 100 may contain other devices, systems, or media not specifically described herein.

Figure 2:
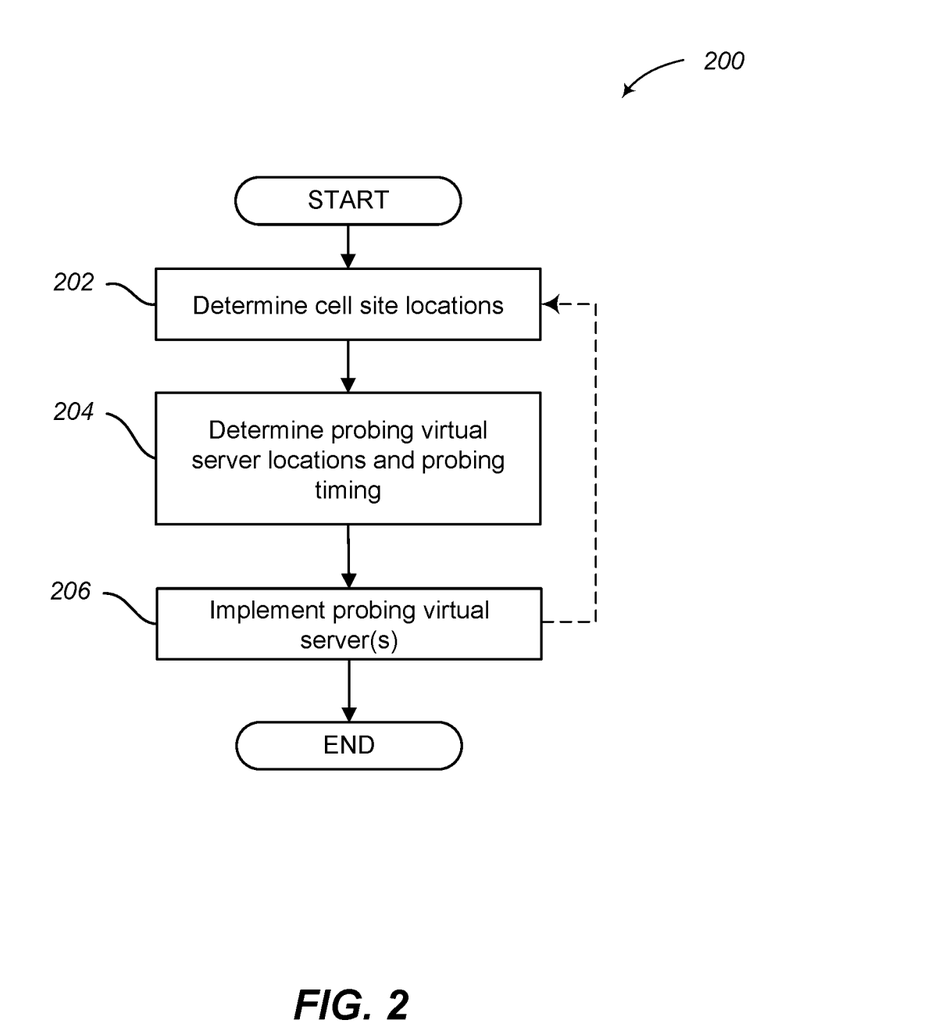
FIG. 2 is a flow diagram depicting an example process 200 to implement one or more virtual servers for cell site probing in accordance with some embodiments of the techniques described herein.

FIG. 2 is a flow diagram depicting an example process 200 to implement one or more virtual servers for cell site probing in accordance with some embodiments of the techniques described herein. In various embodiments, the process 200 is performed in real time, and at least some part of the process 200 is performed in a transparent manner to a user of the user device 124. Illustratively, at least some part of the process 200 can be implemented by the probing service 102 of FIG. 1.

The process 200 starts at block 202, which includes determining locations of cell sites that serve a communications network (e.g., a 5G cellular network). The location of a cell site can be a geographic location (e.g., a state, city, street, community, building, or the like) or network location (e.g., a network address, network topology pointer, subnetwork identification, or the like). Determining cell site locations can be achieved by receiving input from system administrators or authorized users, retrieving location data from remote systems in control of or otherwise associated with the cell sites, combinations of the same or the like. In some embodiments, cell site locations can be determined based on an identifier of cell site (e.g., cell site ID which includes monikers indicating the cell site's location). In some embodiments, locations of all the cell sites that serve the communications network are determined. In other embodiments, locations of one or more subsets of the cell sites are determined.

At block 204, the process 200 includes determining locations for one or more probing virtual servers. To implement probing virtual servers in a distributed manner, locations of probing virtual servers are determined so as to efficiently probe cell sites (e.g., in accordance with an efficiency policy or criteria). In some embodiments, this includes determining respective proximities between cell sites and one or more data centers (or other virtual service implementation systems) of cloud service provider(s) (e.g., that at least partially implement the 5G core). Determining the respective proximities can be based on at least one of a physical distance (e.g., straight-line distance or travel distance) or network distance (e.g., network latency or number of relays or hops) between a data center and one or more cell sites' locations. Illustratively, a data center is more likely to be selected as a location of probing virtual server when it has a smaller distance to a large quantity of cell sites. For example, if a data center resides in a same availability zone or logical subnet as a threshold number of cell sites, the data center can be selected as a location for implementing one or more probing virtual servers. In some embodiments, determining locations for probing virtual servers is further based on at least one of a capacity, availability, compatibility, computational capability, or communication capability of the one or more data centers. More than one virtual servers can be implemented at a selected location, depending on one or more of the above described factors.

In some embodiments, the process 200 further includes determining timing for active probing of the at least a subset of the cell sites that serve the communications network. In some embodiments, determining the timing for active probing is based, at least in part, on the determined locations of the plurality of probing virtual servers. For example, the distribution of probing virtual server locations can be analyzed to stagger the probing of cell sites at different times, thereby avoiding a network-wide probing disturbance. The probing virtual server locations can be clustered or otherwise grouped, so that each group performs active probing of cell sites closest to them at a different time (e.g., one group per hour). In some embodiments, determining the timing for active probing is based, at least in part, on at least a real-time status or condition of the communications network. In some embodiments, determining the timing for active probing is based on at least one of a capacity, availability, compatibility, computational capability, or communication capability of the one or more data centers.

At block 206, the process 200 includes implementing probing virtual server(s). Implementing the probing virtual server(s) can be achieved by instantiating or otherwise execute virtual server(s) at the locations determined at block 204. In some embodiments, implementing the one or more probing virtual servers is further based on the determined timing for active probing (e.g., instantiating corresponding probing virtual servers shortly before or at the time for scheduled probing and terminating them once probing is complete, to make efficient use of computational resources).

In some embodiments, the process 200 includes proceeding back to block 202 to further determine cell site locations, which may include additional or removed cell site(s), or updated cell site location information.

Figure 3:
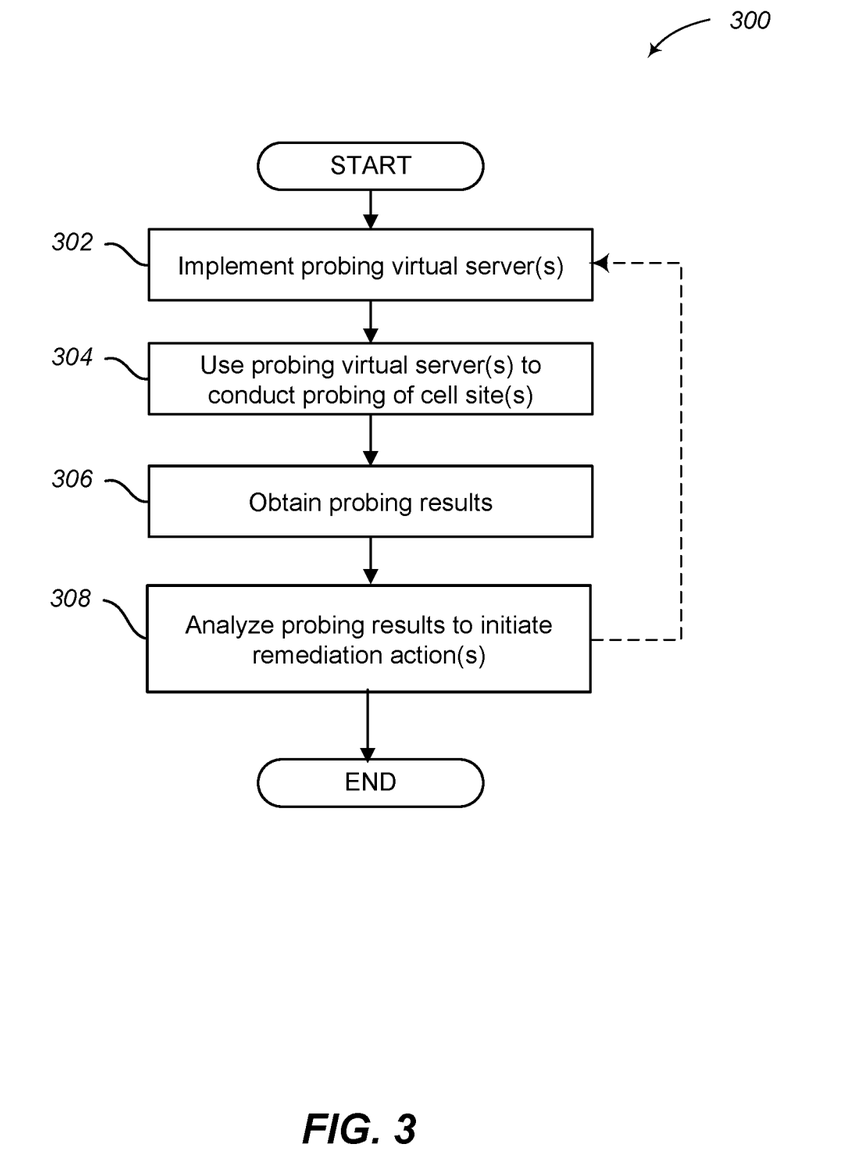
FIG. 3 is a flow diagram depicting an example process 300 for active cell site probing in accordance with some embodiments of the techniques described herein.

FIG. 3 is a flow diagram depicting an example process 300 for active cell site probing in accordance with some embodiments of the techniques described herein. In various embodiments, the process 300 is performed in real time, and at least some part of the process 300 is performed in a transparent manner to a user of the user device. Illustratively, at least some part of the process 300 can be implemented by the probing service 102 of FIG. 1, and can be performed independently, in parallel, or as a supplement to the process 200.

The process 300 starts at block 302, which includes implementing one or more virtual servers for probing cell sites of a communications network (e.g., the same communications network as described in process 200). Because the amount of computation and communication resources required for implementing all virtual servers as a global operation for the entire network is very high, this action can be performed periodically (e.g., once a day), in a staggered manner (e.g., one portion of the network at a time), or as triggered by network performance events (e.g., network outage or malfunction messages exceeding a threshold). In some embodiments, the implementation of probing virtual server(s) is performed in accordance with block 206 of process 200. In some embodiments, the probing virtual server(s) can be implemented at one or more network routers (e.g., virtual or non-virtual) of one or more cloud service providers that implement at least a part of the core of the communications network.

At block 304, the process 300 includes using the probing virtual server(s) to conduct active probing of cell site(s). In some embodiments, each probing virtual server is assigned a set of cell site(s) closest to the server (e.g., in physical distance or network distance), which can be pre-assigned or dynamically determined. In some embodiments, the set of assigned cell site(s) may change from time to time, e.g., based on probing timing applicable to a specific virtual server. In some embodiments, probing timing can be manually set or automatically determined based on cell site status or communications network condition (e.g., historical or real-time). The probing virtual server can execute script(s) or other executables to initiate probing of each cell site in the assigned set to assess network connectivity. For example, the probing virtual server can ping a cell site to verify layer-3 connectivity, determine latency, or otherwise assess performance of communication with the cell site.

At block 306, the process 300 includes obtaining probing results. From each probing virtual server, probing results can be obtained. In some embodiments, the probing results can include operational status of cell site(s), connectivity to cell site(s), quality of service(s), combination of the same or the like. In addition, probing results can include metadata or other contextual information obtained from other components or elements of the network core. Once probing is completed and results reported to the probing service 102, the corresponding probing virtual server can be terminated.

At block 308, the process 300 includes analyzing the probing results. In some embodiments, analyzing the results from the active probing includes determining at least one of a cell outage, communication degradation, or service malfunction. In some embodiments, the process 300 further includes requesting one or more remote systems to remediate at least a cell site condition based, at least in part, on the analyzed results. For example, based on the condition and the location of an affected cell site, request(s) can be sent to a remote system that controls or services the cell site to initiate software debugging, system resetting, tower maintenance, optical fiber repairing or replacement.

In some embodiments, the process 300 includes proceeding back to block 302 to further implement probing virtual server(s), which may or may not be the same as those previously implemented.

The various operations depicted via FIGS. 2 and 3, as well as those described elsewhere herein, may be altered in a variety of ways. For example, the particular order of the operations may be rearranged; some operations may be performed in parallel; shown operations may be omitted, or other operations may be included; a shown operation may be divided into one or more component operations, or multiple shown operations may be combined into a single operation, etc.

Figure 4:
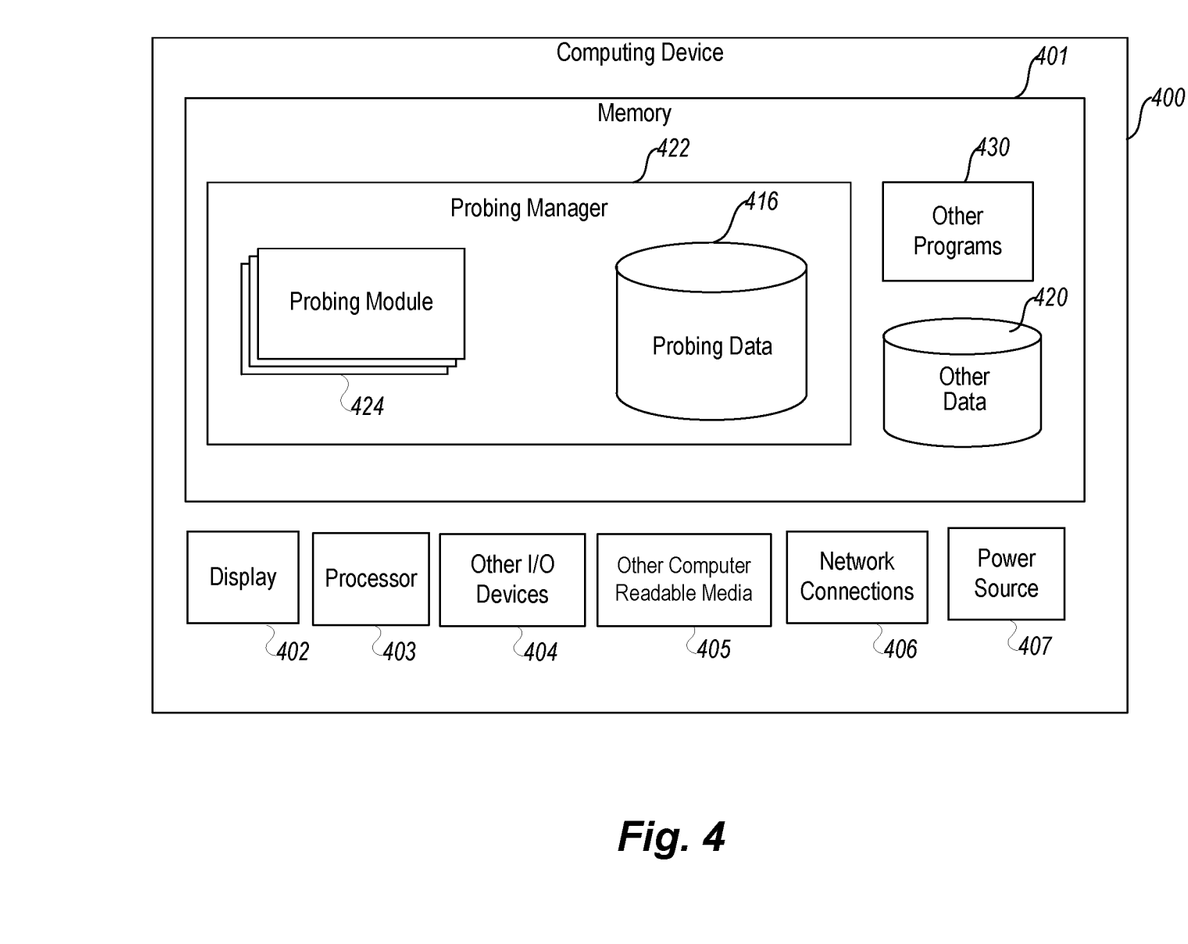
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to a probing service 102, an element or component of communication connections 110, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the probing manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The probing manager 422 is shown residing in memory 401. In other embodiments, some portion of the contents and some, or all, of the components of the probing manager 422 may be stored on and/or transmitted over the other computer-readable media 405. The components of the computing device 400 and probing manager 422 can execute on one or more processors 403 and implement applicable functions described herein. In some embodiments, the probing manager 422 may operate as, be part of, or work in conjunction and/or cooperation with other software applications stored in memory 401 or on various other computing devices. In some embodiments, the probing manager 422 also facilitates communication with peripheral devices via the I/O devices 404, or with another device or system via the network connections 406.

The one or more probing modules 424 is configured to perform actions related, directly or indirectly, to network probing as described herein. In some embodiments, the probing module(s) 424 stores, retrieves, or otherwise accesses at least some probing-related data on some portion of the probing data storage 416 or other data storage internal or external to the computing device 400. In various embodiments, at least some of the probing modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and probing manager 422 include API(s) that provides programmatic access to add, remove, or change one or more functions of the computing device 400. In some embodiments, components/modules of the computing device 400 and probing manager 422 are implemented using standard programming techniques. For example, the probing manager 422 may be implemented as an executable running on the processor(s) 403, along with one or more static or dynamic libraries. In other embodiments, the computing device 400 and probing manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the probing manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a probing manager 422 implementation. Also, other functions could be implemented and/or performed by each component/module, and in different orders, and by different components/modules, yet still achieve the functions of the computing device 400 and probing manager 422.

In addition, programming interfaces to the data stored as part of the computing device 400 and probing manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The probing data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the probing manager 422.

Furthermore, in some embodiments, some or all of the components of the computing device 400 and probing manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for distributed, dynamic probing of cell sites associated with a cellular communications network, the method comprising:
   determining locations of a plurality of cell sites, each including at least one of a cellular tower or controller, that serve the cellular communications network;
   determining locations for dynamically establishing a plurality of probing virtual servers in a distributed manner via a cloud service provider based, at least in part, on the locations of cell sites;
   implementing one or more probing virtual servers via the cloud service provider in accordance with the determined locations for the plurality of probing virtual servers;
   using the one or more probing virtual servers to conduct active probing of at least a subset of the plurality of cell sites; and
   analyzing results from the active probing to initiate one or more remediation actions for the cellular communications network.

2. The method of claim 1, wherein the locations of the plurality of cell sites include at least one of a geographic location or network location.

3. The method of claim 1, wherein determining locations for the plurality of probing virtual servers comprises determining respective proximities between one or more data centers of the cloud service provider and the plurality of cell sites.

4. The method of claim 3, wherein determining the respective proximities is based on at least one of a physical distance or network distance.

5. The method of claim 3, wherein determining locations for the plurality of probing virtual servers is further based on at least one of a capacity, availability, compatibility, computational capability, or communication capability of the one or more data centers.

6. The method of claim 1, further comprising determining timing for active probing of the at least a subset of the plurality of cell sites.

7. The method of claim 6, wherein determining the timing for active probing is based, at least in part, on the determined locations of the plurality of probing virtual servers.

8. The method of claim 6, wherein determining the timing for active probing is based, at least in part, on at least a real-time status or condition of the cellular communications network.

9. The method of claim 6, wherein implementing the one or more probing virtual servers is further based on the determined timing for active probing.

10. The method of claim 1, wherein analyzing the results from the active probing comprises determining at least one of a cell outage, communication degradation, or service malfunction.

11. A probing system for a cellular communications network, comprising:
    at least one memory that stores computer executable instructions; and
    at least one processor that executes the computer executable instructions to cause actions to be performed, the actions comprising:

determining locations for implementing a plurality of probing virtual servers via a cloud service provider based, at least in part, on locations of a plurality of cell sites that serve the cellular communications network;

implementing one or more probing virtual servers via the cloud service provider in accordance with the determined locations for the plurality of probing virtual servers;

using the one or more probing virtual servers to conduct active probing of at least a subset of the plurality of cell sites to assess cellular communication performance of individual cell sites of the subset; and analyzing results from the active probing to initiate one or more remediation actions for the cellular communications network.

12. The system of claim 11, wherein determining locations for the plurality of probing virtual servers comprises determining respective proximities between one or more virtual service implementation systems of the cloud service provider and the plurality of cell sites.

13. The system of claim 11, wherein the actions further comprise determining timing for active probing of the at least a subset of the plurality of cell sites.

14. The system of claim 13, wherein determining the timing for active probing is based on at least one of a capacity, availability, compatibility, computational capability, or communication capability of the one or more virtual service implementation systems.

15. The system of claim 13, wherein implementing the one or more probing virtual servers is further based on the determined timing for active probing.

16. The system of claim 11, wherein the actions further comprise requesting one or more remote systems to remediate at least a cell site condition based, at least in part, on the analyzed results.

17. A non-transitory computer-readable medium storing contents that, when executed by one or more processors, cause the one or more processors to perform actions comprising:

determining locations for a plurality of probing virtual servers based, at least in part, on locations of a plurality of cell sites of a cellular communications network;

implementing one or more probing virtual servers in accordance with the determined locations for the plurality of probing virtual servers;

using the one or more probing virtual servers to conduct active probing of at least a subset of the plurality of cell sites; and analyzing results, including at least one of operational status of individual cell sites in the cellular communications network or connectivity to individual cell sites in the cellular communications network, from the active probing to initiate one or more remediation actions for the cellular communications network.

18. The computer-readable medium of claim 17, wherein determining locations for the plurality of probing virtual servers comprises determining a measure of proximity based on at least one of a physical distance or network distance.

19. The computer-readable medium of claim 17, wherein the actions further comprise determining timing for active probing of the at least a subset of the plurality of cell sites.

20. The computer-readable medium of claim 19, wherein implementing the one or more probing virtual servers is further based on the determined timing for active probing.

* * * * *